United States Patent [19]

Rosen

[11] 4,401,639

[45] Aug. 30, 1983

[54] PREPARATION OF CARBONYL CYANIDE

[75] Inventor: Bruce I. Rosen, Skokie, Ill.

[73] Assignee: UOP Inc., Des Plaines, Ill.

[21] Appl. No.: 391,752

[22] Filed: Jun. 24, 1982

[51] Int. Cl.$^3$ .............................................. C01C 3/14
[52] U.S. Cl. ..................................................... 423/365
[58] Field of Search ........................................ 423/365

[56] References Cited

PUBLICATIONS

Kociolek & Leplawy, *Synthesis*, 778, (1977).
Banucci, *Synthesis*, 671, (1973).
Banucci, *J. Polymer Sci.*, 11, 2947, (1973).
E. L. Martin, *Org. Syn.*, 51, 70, (1971).
Verbeek and Sundermeyer, *Angew. Chem., Internat. Edit.*, 6, 871, (1967).
Achmatowicz and Leplawy, *C. A.*, 10033d, (1959).
C. M. Starks, *J. Amer. Chem. Soc.*, 93, 195, (1971).
J. Dockx, *Synthesis*, 441, (1973).
G. W. Gokel and W. P. Weber, *J. Chem. Educ.*, 55, 350, 429, (1978).
K. E. Koenig & W. P. Weber, *Tetrahedron Letters*, 2275, (1974).
M. E. Childs & W. P. Weber, *J. Org. Chem.*, 41, 3486, (1976).

*Primary Examiner*—O. R. Vertiz
*Assistant Examiner*—Wayne A. Langel
*Attorney, Agent, or Firm*—James R. Hoatson, Jr.; Eugene I. Snyder; William H. Page, II

[57] ABSTRACT

Carbonyl cyanide may be prepared by reacting a solution of a trihalomethyl haloformate in an organic solvent with a cyanide salt in the presence of a phase transfer catalyst. Carbonyl cyanide may be prepared by this method in good yield and with great convenience.

12 Claims, No Drawings

PREPARATION OF CARBONYL CYANIDE

BACKGROUND OF THE INVENTION

Although phosgene, $COCl_2$, is a widely used article of commerce, carbonyl cyanide, $CO(CN)_2$, the cyano analogue of phosgene, is used only sparingly. In large part this difference in utilization arises from difficulty in preparing carbonyl cyanide. Carbonyl cyanide is used in the preparation of cyanoformates, affords Diels-Alder adducts with some dienes, and recently has been used in the preparation of ene adducts (Kociolek and Leplawy, *Synthesis*, 778 (1977)) and in preparing a class of cyanopolyesters (E. G. Banucci, *Synethesis*, 671 (1973); *J. Polymer Sci.*, 11, 2947 (1973)).

Among the prior art methods of preparation, oxidation of tetracyanoethylene is, perhaps, the most developed route to carbonyl cyanide (E. L. Martin, *Org. Syn.*, 51, 70 (1971)). Alternate methods of preparation include the reaction of carbonyl fluoride with potassium cyanide dissolved in a melt of lithium chloride and potassium chloride at 400° C. (W. Verbeek and W. Sundermeyer, *Angew. Chem., internat. Edit.*, 6, 871 (1967)) and pyrolysis of acetoxyiminoacetic cyanide (O. Achmatowicz and M. Leplawy, C. A., 10033d (1959)).

Phase transfer catalysis is a technique of much interest in recent years. See C. M. Starks, *J. Amer. Chem. Soc.*, 93, 195 (1971); J. Dockx, *Synthesis*, 441 (1973); G. W. Gokel and W. P. Weber, *J. Chem. Educ.*, 55 350, 429 (1978). In this process a reagent, called a phase transfer catalyst, when added to an aqueous phase in contact with an immiscible organic phase forms an ion-pair with the ionic component present, e.g., a cyanide salt. Because the formed ion-pair has appreciable solubility in organic solvents it is carried, at least in part, across the phase boundary from the aqueous to the organic phase, where it retains its identity as ion-pair. This ion-pair in the organic phase then can react with another component dissolved in the organic phase to form the desired product. Because this reaction occurs homogeneously its rate is greater than when the reaction is conducted heterogeneously, and undesirable side reactions otherwise present may be diminished or even eliminated. After reaction, a different ion-pair is formed involving the phase transfer catalyst and this new ion-pair crosses from the organic into the aqueous phase where the phase transfer catalyst is again available to form an ion pair with an ionic reactant in the aqueous phase, e.g. cyanide ion. Thus, the phase transfer catalyst truly acts as a catalyst and needs to be employed in less than stoichiometric amounts.

In a variant where the phase transfer catalyst is soluble in the organic solvent, the ionic reactant is used as a solid rather than in aqueous solution. This variant may be referred to as solid-liquid phase transfer catalysis, whereas that described in the prior paragraph may be referred to as liquid-liquid phase transfer catalysis.

Phase transfer catalysis has been used in the preparation of acid cyanides, RCOCN, from acid halides (K. E. Koenig and W. P. Weber, *Tetrahedron Letters*, 2275 (1974)). The technique of phase transfer catalysis is particularly useful in the preparation of cyanoformates,

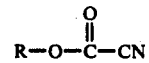

(M. E. Childs and W. P. Weber, *J. Org. Chem.*, 41, 3486 (1976)). Significantly, these latter authors report that the attempted preparation of carbonyl cyanide by reaction of phosgene-the dichloride of carbonic acid-with potassium cyanide under conditions of phase transfer catalysis failed under a wide variety of experimental conditions.

SUMMARY OF THE INVENTION

The purpose of this invention is to prepare carbonyl cyanide in good yields by a convenient route. An embodiment is the reaction of trichloromethyl chloroformate with a cyanide salt in the presence of a phase transfer catalyst. In a more specific embodiment the salt is one of an alkali metal. In a still more specific embodiment the salt is potassium or sodium cyanide, and the phase transfer catalyst is a cyclic polyether.

DESCRIPTION OF THE INVENTION

The invention described herein is a method of preparing carbonyl cyanide. Very briefly, the preparation involves the reaction of a solution of a trihalomethyl haloformate, $X_3CO(CO)Y$, in an organic solvent with a cyanide salt, MCN, in the presence of a phase transfer catalyst, and recovering the formed carbonyl cyanide. This reaction is summarized by the following equation.

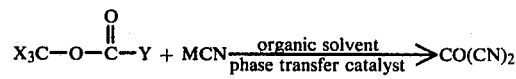

One reactant in the method of preparation described herein is a member of the class of trihalomethyl haloformates, $X_3CO(CO)Y$. The halogen, X, of the trihalomethyl group may be fluorine, chlorine, or bromine, with chlorine being used advantageously because of its relative availability. The halogen, Y, of the haloformate may be chlorine, bromine or iodine, with chlorine again being the halogen of choice for the sake of convenience.

The trihalomethyl haloformate is dissolved in an organic solvent immiscible with water whose nature is not a critical element of this invention. Purely for convenience it has been found that hydrocarbons, both aliphatic and aromatic, and halogenated hydrocarbons, particularly chlorinated hydrocarbons, are desirable solvents. Among those materials which have been used successfully are included methylenechloride, chloroform, carbon tetrachloride, dichloroethane, chlorinated propanes, and other more highly chlorinated aliphatic hydrocarbons generally utilized as solvents, benzene, toluene, the xylenes, propylbenzene, chlorobenzene, chlorotoluene, chlorinated xylenes, and so forth.

A solution of the trihalomethyl haloformate in an organic solvent is reacted with a cyanide salt, MCN, in the presence of a phase transfer catalyst. Any cyanide salt affording cyanide ions and which would suitably interact with the phase transfer catalysts of this invention may be used in the method of this invention. As a group the alkali metal cyanides are preferred, i.e., those where M is an alkali metal, and among these potassium, lithium, and sodium cyanide are especially preferred.

One group of phase transfer catalysts which may be used in this invention are quaternary ammonium and quaternary phosphonium salts. These can be written as $R_1R_2R_3R_4Z^+Y^-$, where Z is nitrogen of phosphorus and the R groups are alkyl or aralkyl groups containing from about 1 to about 20 carbon atoms. Illustrative examples of suitable alkyl and aralkyl groups include methyl, ethyl, propyl, butyl, pentyl, hexyl, heptyl, octyl, nonyl, decyl, undecyl, dodecyl, tridecyl, tetradecyl, hexadecyl, heptadecyl, octadecyl, nonadecyl, eicosyl, benzyl, methoxybenzyl, chlorobenzyl, 2-phenylethyl, 2-phenylpropyl, 3-phenylpropyl, 2-phenylbutyl, 3-phenylbutyl, 4-phenylbutyl, etc. Each of the R groups may be different, or 2 or more such R groups may be the same. The sole limitation is that the resultant quaternary ammonium or phosphonium compound be sufficiently lipophilic to be appreciably soluble in the organic phase. The nature of the anion, Y, is not critical, usually being a halide, such as chloride, bromide, or iodide. Chlorides often are preferred because of their availability. Other anions, such as bisulfate, nitrate, perchlorate, acetate, etc., may be used, although not necessarily with equivalent results.

Another class of phase transfer catalysts contain cyclic polyethers which strongly complex with at least one of the alkali metal cations. Among these are cyclic poly(ethyleneoxy) ethers generically. These include the so-called crown ethers and cryptates; G. W. Gokel and W. P. Weber, op. cit. The crown ethers have a terminology peculiar to themselves and are referred to as a-crown-b, where a is the ring size and b is the number of oxygens in the ring. Crown ethers of differing ring size show different complexing ability toward the various alkali metals. For example, 12-crown-4 shows optimum complexation toward the lithium cation, 15-crown-5 is optimum for sodium ion complexation, and 18-crown-6 is best for the potassium cation. Consequently, in this branch of the invention that crown ether which best complexes with the metal used as the cyanide source will be the one of choice.

Although the phase transfer catalyst needs be present only in catalytic quantities, it has been found that for the reaction to proceed at a convenient rate it is best to have substantially larger quantities present. The amount of phase transfer catalyst will depend upon the specific nature of the catalyst, the reaction temperature, and metal cyanide used, but generally will be between about 0.01 and about 10 mole percent based on the amount of cyanide used, desirably between about 0.05 and about 5 mole percent, and more desirably between about 0.1 and about 2 mole percent.

Because carbonyl cyanide reacts explosively with water, this invention is practiced preferably in the solid-liquid phase transfer catalysis variation under anhydrous conditions. Briefly, the trihalomethyl haloformate may be dissolved in a suitable organic solvent. A source of cyanide ion may be added as a finely divided solid in about two molar proportions based on haloformate, although an excess up to about 25% may be used advantageously. Larger amounts of cyanide, although operative, afford no advantage and merely increased expense. The phase transfer catalyst may be added in an amount from about 0.01 to about 10 mole percent based on cyanide and the mixture stirred. The reaction proceeds at a convenient rate at ambient temperature, but increasing reaction temperature is not deleterious. Changing the pressure without a concomitant change in temperature is without any sensible effect. In the range from about 5° to about 20° C. the reaction may be complete within several hours, and at 100° C. the reaction time is too short for adequate control.

The following example is merely illustrative of this invention and is not intended to limit it in any way.

EXAMPLE

In a 50 ml round bottom flask equipped with a reflux condenser, nitrogen inlet, and containing a stirring bar may be placed 30 ml methylene chloride, 1.3 g (0.02 mol) potassium cyanide, 1.9 g (0.01 mol) trichloromethyl chloroformate, and about 50 mg (0.02 mmol) of 18-crown-6. The mixture may be stirred at room temperature and the reaction followed by the appearance of bands in the infra-red at 2240 cm$^{-1}$ (C≡N) and at 1710 cm$^{-1}$ (C=O), as well as disappearance of the carbonyl band of the starting chloroformate. When the reaction is deemed complete solid may be removed by filtration and the filtrate distilled to afford product boiling at 65°-6° C.

What is claimed is:

1. A method of preparing carbonyl cyanide comprising reacting the solution of a trihalomethyl haloformate, $X_3CO(CO)Y$, in an organic solvent with a cyanide salt in the presence of a phase transfer catalyst, and recovering the formed carbonyl cyanide.

2. The method of claim 1 where the halogen, X, of the trihalomethyl group is fluorine, chlorine, or bromine.

3. The method of claim 2 where the halogen is chlorine.

4. The method of claim 1 where the halogen, Y, of the haloformate is chlorine, bromine, or iodine.

5. The method of claim 4 where the halogen is chlorine.

6. The method of claim 1 where the cation of said cyanide salt is an alkali metal cation.

7. The method of claim 6 where the alkali metal is lithium, sodium, or potassium.

8. The method of claim 7 where the alkali metal is potassium.

9. The method of claim 1 where the phase transfer catalyst is selected from the group consisting of quaternary ammonium salts, quaternary phosphonium salts, and cyclic polyethers which complex with at least one alkali metal cation.

10. The method of claim 9 where the polyether is a cyclic poly(ethyleneoxy) ether.

11. The method of claim 9 where the phase transfer catalyst is used in the mole ratio from about 0.01 to about 5 mole percent relative to the cyanide salt.

12. The method of claim 1 where the organic solvent is selected from the group consisting of hydrocarbons and chlorinated hydrocarbons.

* * * * *